United States Patent
Jackson et al.

(10) Patent No.: US 11,542,208 B2
(45) Date of Patent: Jan. 3, 2023

(54) ENVIRONMENTAL BARRIER COATING

(71) Applicant: UNITED TECHNOLOGIES CORPORATION, Farmington, CT (US)

(72) Inventors: Richard Wesley Jackson, Mystic, CT (US); Xia Tang, West Hartford, CT (US); James T. Beals, West Hartford, CT (US); Michael R. Kracum, Albuquerque, NM (US); Zhongfen Ding, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 315 days.

(21) Appl. No.: 16/785,012

(22) Filed: Feb. 7, 2020

(65) Prior Publication Data

US 2021/0246080 A1     Aug. 12, 2021

(51) Int. Cl.
*C04B 41/00* (2006.01)
*C04B 35/78* (2006.01)
(Continued)

(52) U.S. Cl.
CPC ............ *C04B 41/009* (2013.01); *C04B 35/78* (2013.01); *C04B 41/4543* (2013.01); *C04B 41/5024* (2013.01); *C04B 41/5035* (2013.01); *C04B 41/5059* (2013.01); *F01D 5/284* (2013.01); *F01D 5/288* (2013.01);
(Continued)

(58) Field of Classification Search
CPC ... C04B 41/009; C04B 35/78; C04B 41/4543; C04B 41/5024; C04B 41/5035; C04B 41/5059; C04B 41/5089; C04B 41/52; C04B 41/89; C04B 41/87; F01D 5/284; F01D 5/288; F05D 2230/90; F05D 2300/211; F05D 2300/2261;
(Continued)

(56) References Cited

U.S. PATENT DOCUMENTS

| | | | | |
|---|---|---|---|---|
| 5,130,400 A | * | 7/1992 | Pachaly | ............... C08G 77/48 423/337 |
| 6,299,988 B1 | | 10/2001 | Wang et al. | |

(Continued)

FOREIGN PATENT DOCUMENTS

| | | | | |
|---|---|---|---|---|
| WO | 2015147960 | | 10/2015 | |
| WO | WO-2015147960 A1 | * | 10/2015 | ............ B32B 9/005 |

OTHER PUBLICATIONS

European Search Report for European Patent Application No. 21155329.2 dated Jun. 18, 2021.

*Primary Examiner* — Jacob M Amick
*Assistant Examiner* — Charles J Brauch
(74) *Attorney, Agent, or Firm* — Carlson, Gaskey & Olds, P.C.

(57) ABSTRACT

An article includes a ceramic-based substrate and a barrier layer on the ceramic-based substrate. The barrier layer includes a matrix phase and a network of gettering particles in the matrix phase. The gettering particles have an average maximum dimension between about 30 and 70 microns. The gettering particles have maximum dimensions that range from about 1 to 100 microns, and a dispersion of barium-magnesium alumino-silicate particles in the matrix phase. A composite material and a method of applying a barrier layer to a substrate are also disclosed.

23 Claims, 2 Drawing Sheets

(51) Int. Cl.
  *C04B 41/45* (2006.01)
  *C04B 41/50* (2006.01)
  *F01D 5/28* (2006.01)
(52) U.S. Cl.
  CPC .... *F05D 2230/90* (2013.01); *F05D 2300/211* (2013.01); *F05D 2300/2261* (2013.01); *F05D 2300/6033* (2013.01)
(58) Field of Classification Search
  CPC ....... F05D 2300/6033; F05D 2300/609; F05D 2300/611; Y02T 50/60
  See application file for complete search history.

(56) References Cited

U.S. PATENT DOCUMENTS

| | | |
|---|---|---|
| 2016/0194476 A1 | 7/2016 | Lipkin et al. |
| 2017/0016335 A1 | 1/2017 | Kirby et al. |
| 2017/0190920 A1 | 7/2017 | Nakamura et al. |
| 2019/0226346 A1 | 7/2019 | Kirby |
| 2020/0010375 A1 | 1/2020 | Tang et al. |
| 2020/0062664 A1 | 2/2020 | Tang et al. |

\* cited by examiner

ENVIRONMENTAL BARRIER COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article according to an exemplary embodiment of this disclosure, among other possible things includes a ceramic-based substrate and a barrier layer on the ceramic-based substrate. The barrier layer includes a matrix phase and a network of gettering particles in the matrix phase. The gettering particles have an average maximum dimension between about 30 and 70 microns. The gettering particles have maximum dimensions that range from about 1 to 100 microns. The barrier layer also includes a dispersion of diffusive particles in the matrix phase.

In a further example of the foregoing, the barrier layer includes, by volume, 30-94% of the gettering particles.

In a further example of any of the foregoing, the barrier layer includes, by volume, 60-90% of the gettering particles.

In a further example of any of the foregoing, the barrier layer includes, by volume, 1-30% of the diffusive particles, 5-40% of the matrix of SiO2, and a balance of the gettering particles.

In a further example of any of the foregoing, the diffusive particles have an average maximum dimension that is smaller than the average maximum dimension of the gettering particles.

In a further example of any of the foregoing, the gettering particles have an average maximum dimension that is between about 40 and 60 microns.

In a further example of any of the foregoing, the gettering particles have dimensions between about 5-75 microns.

In a further example of any of the foregoing, the gettering particles are spherical.

In a further example of any of the foregoing, the gettering particles are reactive with respect to oxidant species.

In a further example of any of the foregoing, the gettering particles include at least one of silicon oxycarbide (SiOC) particles, silicon carbide (SiC) particles, silicon nitride ($Si_3N_4$), silicon oxycarbonitride (SiOCN) particles, silicon aluminum oxynitride (SiAlON) particles, and silicon boron oxycarbonitride (SiBOCN) particles.

In a further example of any of the foregoing, the diffusive particles include at least one of barium magnesium aluminum silicate (BMAS), barium strontium aluminum silicate, magnesium silicate, alkaline earth aluminum silicate, yttrium aluminum silicate, ytterbium aluminum silicate, and rare earth metal aluminum silicate particles.

In a further example of any of the foregoing, the article further comprises a distinct intermediate layer between the barrier layer and the ceramic-based substrate, the distinct intermediate layer including an intermediate layer matrix of $SiO_2$ and a dispersion of intermediate layer gettering particles in the intermediate layer matrix.

In a further example of any of the foregoing, the gettering particles are silicon oxycarbide particles that have a composition SiOxMzCy, where M is at least one metal, x<2, y>0 and z<1 and x and z are non-zero.

In a further example of any of the foregoing, the article includes a ceramic-based top coat on the barrier layer.

A composite material according to an exemplary embodiment of this disclosure, among other possible things includes a matrix of SiO2 and a dispersion of silicon oxycarbide particles in the matrix. The silicon oxycarbide particles have Si, O, and C in a covalently bonded network. The silicon oxycarbide particles have an average maximum dimension between about 30 and 70 microns. The silicon oxycarbide particles have maximum dimensions that range from about 1 to 100 microns. The composite material also includes a dispersion of barium-magnesium alumino-silicate particles in the matrix.

In a further example of the foregoing, the silicon oxycarbide particles have an average maximum dimension that is between about 40 and 60 microns.

In a further example of any of the foregoing, the silicon oxycarbide particles are approximately spherical.

In a further example of any of the foregoing, the silicon oxycarbide particles are reactive with respect to oxidant species.

A method of applying a barrier layer to a substrate according to an exemplary embodiment of this disclosure, among other possible things includes mixing particles of barium-magnesium alumino-silicate, particles of SiO2, and particles of silicon oxycarbide in a carrier fluid to form a slurry. The silicon oxycarbide particles have an average maximum dimension between about 30 and 70 microns. The silicon oxycarbide particles have maximum dimensions that range from about 1 to 100 microns. The method includes applying the slurry to a substrate, drying the slurry, and curing the slurry such that cross-linking occurs in the composite material.

In a further example of the foregoing, the application is by spraying.

DETAILED DESCRIPTION

Figure 1:
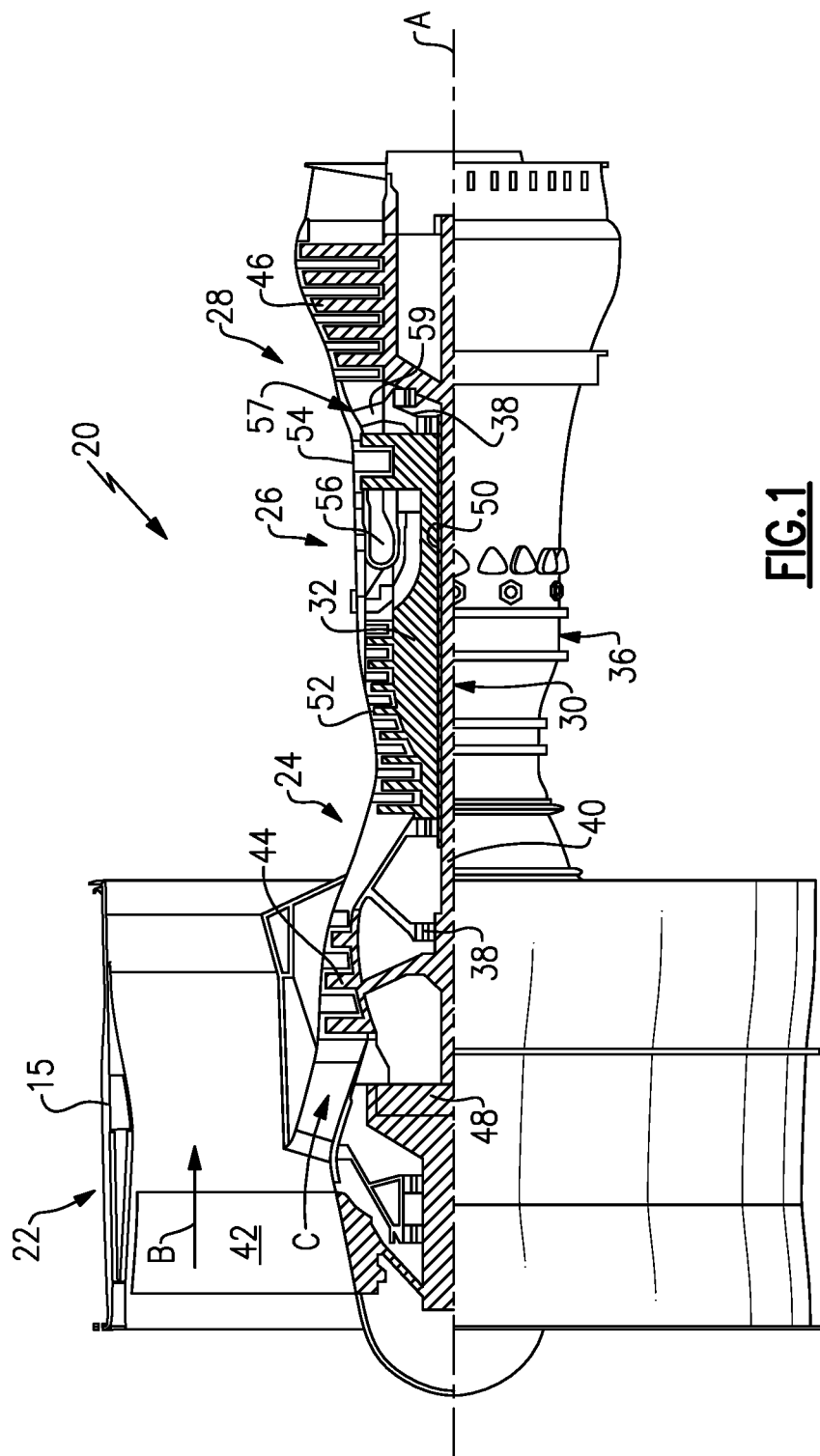
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades in the fan section 22 disclose an example gas turbine engine 20 with increased power transfer efficiency.

Figure 2:
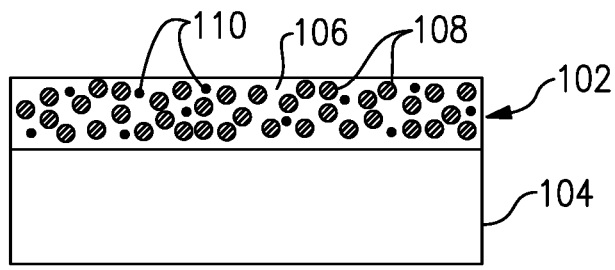
FIG. 2 illustrates an example article having a barrier layer of a composite material that includes barium-magnesium alumino-silicate particles.

FIG. 2 schematically illustrates a representative portion of an example article 100 for the gas turbine engine 20 that includes a composite material 102 that is used as a barrier layer. The article 100 can be, for example, an airfoil in the compressor section 24 or turbine section 28, a combustor liner panel in the combustor section 26, a blade outer air seal, or other component that would benefit from the examples herein. In this example, the composite material 102 is used as an environmental barrier layer to protect an underlying substrate 104 from environmental conditions, as well as thermal conditions. As will be appreciated, the composite material 102 can be used as a stand-alone barrier layer, as an outermost/top coat with additional underlying layers, or in combination with other coating under- or over-layers, such as, but not limited to, ceramic-based topcoats.

The composite material 102 includes a matrix of silicon dioxide ($SiO_2$) 106, a dispersion of "gettering" particles, and a dispersion of diffusive particles. In one example, the gettering particles are silicon oxycarbide particles (SiOC) 108 and the diffusive particles are barium-magnesium alumino-silicate particles 110 ("BMAS particles"), though other examples are contemplated. The gettering particles 108 could be, for instance, silicon oxycarbide (SiOC) particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. The diffusive particles 110 could be, for instance, BMAS particles, barium strontium aluminum silicate particles, magnesium silicate particles, alkaline earth aluminum silicate particles, yttrium aluminum silicate particles, ytterbium aluminum silicate particles, other rare earth metal aluminum silicate particles, or combinations thereof.

Figure 3:
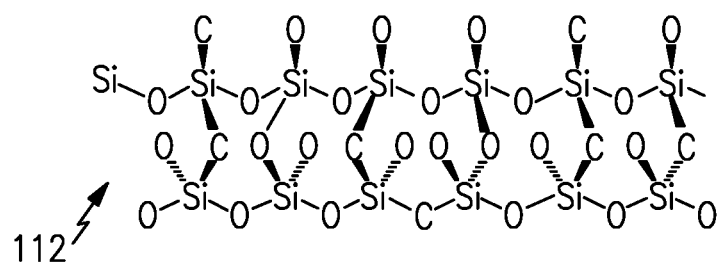
FIG. 3 illustrates a network of silicon oxycarbide.

The gettering particles 108 form a network within the matrix. For instance, silicon oxycarbide particles 108 have silicon, oxygen, and carbon in a covalently bonded network, as shown in the example network 112 in FIG. 3.

The network 112 is amorphous and thus does not have long range crystalline structure. The illustrated network 112 is merely one example in which at least a portion of the silicon atoms are bonded to both O atoms and C atoms. As can be appreciated, the bonding of the network 112 will vary depending upon the atomic ratios of the Si, C, and O. In one example, the silicon oxycarbide particles 108 have a composition $SiO_xM_zC_y$, where M is at least one metal, x<2, y>0, z<1, and x and z are non-zero. The metal can include aluminum, boron, transition metals, refractory metals, rare earth metals, alkaline earth metals or combinations thereof.

In one example, the composite material 102 includes, by volume, 1-30% of the diffusive/BMAS particles 110. In a more particular example, the composite material 102 includes, by volume, 1-10% of diffusive particles. In a further example, the composite material 102 includes, by volume, 30-94% of the gettering particles 108. In a particular example, the composite material includes, by volume, 60-90% of the gettering/particles 108. In one further example, the composite material 102 includes, by volume, 5-40% of the matrix 26 of silicon dioxide. In a further example, the composite material 102 includes, by volume, 1-30% of the diffusive particles 110, 5-40% of the matrix 106 of silicon dioxide, and a balance of the gettering particles 108.

The barrier layer protects the underlying substrate 104 from oxygen and moisture. For example, the substrate 104 can be a ceramic-based substrate, such as a silicon-containing ceramic material. One example is silicon carbide. Another non-limiting example is silicon carbide fibers in a silicon carbide matrix. The gettering particles 108 and the diffusive particles 110 of the barrier layer function as an oxygen and moisture diffusion barrier to limit the exposure of the underlying substrate 104 to oxygen and/or moisture from the surrounding environment. Without being bound by any particular theory, the diffusive particles 110, such as BMAS particles 110, enhance oxidation and moisture protection by diffusing to the outer surface of the barrier layer opposite of the substrate 104 and forming a sealing layer that seals the underlying substrate 104 from oxygen/moisture exposure. Additionally, cationic metal species of the diffusive particles 110 (for instance, for BMAS particles, barium, magnesium, and aluminum) can diffuse into the gettering particles 108 to enhance oxidation stability of the gettering material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles, such as the gettering particles 108, can react with oxidant species, such as oxygen or water that could diffuse into the barrier layer. In this way, the gettering particles could reduce the likelihood of those oxidant species reaching and oxidizing the substrate 104.

It has been discovered that the effectiveness of the gettering particles 108, such as the silicon oxycarbide particles 108, in providing oxidation resistance is related to the surface area of the particles. In general, the greater the surface area of the particles 108, the more likely the individual particles 108 will encounter and react with oxidant species. Further, such reaction causes a consumption of the gettering material and corresponding buildup of oxide scale on the surface of the particles 108, reducing the effective surface area of the particles 108. Thus, the greater the surface area of the particles 108, the more surface area available for reacting with oxidant species, which reduces the likelihood that oxidant species will reach and oxidize the substrate 104. Accordingly, particles 108 with higher surface area generally improve the effectiveness and longevity of the oxidation resistance of the barrier layer. However, practical and processing constraints limit the size of particles 108. If the particles 108 are too large, application of the barrier layer (especially by spray coating, discussed in more detail below) becomes difficult. Also, if the particles 108 are too large, the packing effectiveness of the particles 108 relative to one another within the barrier layer is decreased, meaning in some areas there may be relatively large distances between adjacent particles 108. In those areas, there may be reduced localized oxidation resistance.

The effective surface area of the particles 108 is related to the dimension of the particles 108 and their shape. In one example, effective surface area of the particles 108 can be determined by determining one or more dimensions 108 of the particles by any known imaging technique and calculating the surface area of the particles 108 according to known relationship between the dimensions and the shape. Furthermore, an average effective surface area of the particles 108 within the barrier layer can be approximated based on an average dimensions of the particles 108 with in the barrier layer.

In one example, the particles 108 are approximately spherical in shape, e.g., they have an aspect ratio that is close to one (1:1 ratio). However, other shapes, such as elongated shapes with aspect ratios less than one, are also contemplated.

The particles 108 can be defined by an average maximum dimension of the particles 108. In the example where the particles 108 are approximately spherical, the average maximum dimension corresponds to the diameter of the particles 108, represented by D1 in FIG. 5. In one example, the particles 108 have an average maximum dimension of between about 30-70 microns. Still, any given sample of particles 108 contains particles 108 of different sizes. In a particular example, 65%±5% by volume of the particles 108 have a maximum dimension D1 of between about 30-70 microns. In one example, the modal particle (which is sometimes known as d50) has D1 of about 55 microns, and 10% of the volume of the particles have D1 within about 5% of the modal particle D1 (i.e. D1 ranging between 52.25 and 57.75 microns) and 72% of the volume of the particles having D1 within 50% of the modal particle D1 (i.e. D1 ranging between 27.5 and 82.5 microns). For instance, in one example, the particles 108 have an average maximum dimension of between about 30-70 microns and individual particles 108 have maximum dimensions that range from about 1-100 microns. In another example, the particles 108 have an average maximum dimension of between about 40-60 microns. In a further example, the particles 108 have an average maximum dimension of between about 40-60 microns and individual particles 108 have maximum dimensions that range from about 5-75 microns.

As discussed above, the average maximum dimension of the particles 108 is related to the average effective surface area of the particles 108 in the barrier layer. In turn, a total effective surface area for the particles 108 in the barrier layer is related to the amount of particles 108 in the barrier layer (e.g., vol % of particles 108 in the composite material 102) and the thickness of the barrier layer. Generally, the more particles 108 in the barrier layer (e.g., the higher the vol. % of particles 108 in the composite material 102, the thicker the barrier layer, or both), the higher the total effective surface area for the particles 108 in the barrier layer. For an example barrier layer, the total effective surface area for the particles 108 is between about 12,000 and 564,000 $cm^2$ per centimeter of barrier layer thickness. In a further example, the total effective surface area for the particles 108 is between about 25,700 to 90,000 $cm^2$ per centimeter of barrier layer thickness. In a further example, the total effective surface area for the particles 108 is between about 30,000 to 67,500 $cm^2$ per centimeter of barrier layer thickness. In one example, an average maximum dimension of the BMAS particles 110 is less than the average maximum dimension of the silicon oxycarbide particles 108.

Figure 4:
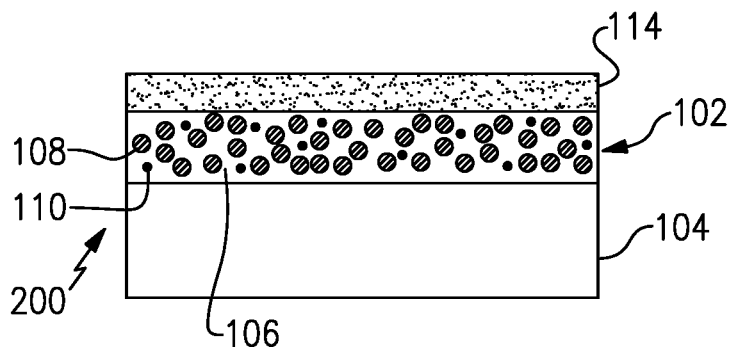
FIG. 4 illustrates another example article having a barrier layer of a composite material that includes barium-magnesium alumino-silicate particles.

FIG. 4 shows another example article 200 that includes the composite material 102 as a barrier layer arranged on the substrate 104. In this example, the article 200 additionally includes a ceramic-based top coat 114 interfaced with the barrier layer. As an example, the ceramic-based top coat 114 can include one or more layers of an oxide-based material. The oxide-based material can be, for instance, hafnium-based oxides, yttrium-based oxides (such as hafnia, hafnium silicate, yttrium silicate, yttria stabilized zirconia or gadolinia stabilized zirconia), or combinations thereof, but is not limited to such oxides.

Figure 5:
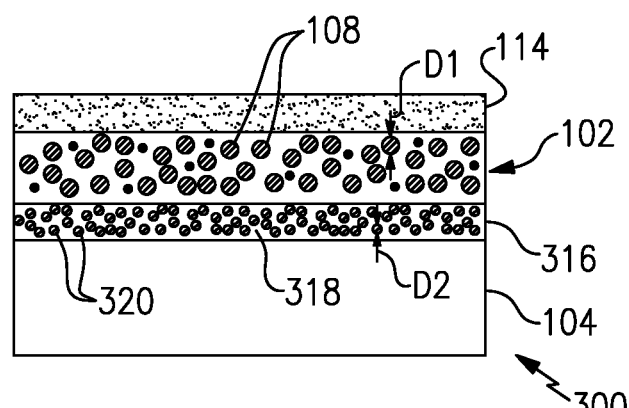
FIG. 5 illustrates another example article having a barrier layer of a composite material that includes barium-magnesium alumino-silicate particles.

FIG. 5 illustrates another example article 300 that is somewhat similar to the article 200 shown in FIG. 4 but includes a distinct intermediate layer 316 interposed between the barrier layer of the composite material 102 and the substrate 104. In this example, the distinct intermediate layer 316 includes an intermediate layer matrix 318 of silicon dioxide and a dispersion of intermediate layer silicon oxycarbide particles 320 in the intermediate layer matrix 318. The intermediate layer silicon oxycarbide particles 320 are similar to the silicon oxycarbide particles 108 in composition but, in this example, the intermediate layer silicon oxycarbide particles 320 have an average maximum dimension (D2) that is less than the average maximum dimension (D1) of the silicon oxycarbide particles 108. The relatively small intermediate layer silicon oxycarbide particles 320 provide a relatively low roughness for enhanced bonding with the underlying substrate 104. The larger silicon oxycarbide particles 108 of the barrier layer provide enhanced blocking of oxygen/moisture diffusion. Thus, in combination, the barrier layer and intermediate layer 316 provide good adhesion and good oxidation/moisture resistance. In one further example, D1 is 44-75 micrometers and D2 is 1-44 micrometers.

In one example, the intermediate layer 316 can include, by volume, 5-40% of the intermediate layer matrix 318 of silicon dioxide and a balance of the intermediate layer silicon oxycarbide particles 320. In further examples, a portion of the BMAS particles 110 from the barrier layer can penetrate or diffuse into the intermediate layer 316, during processing, during operation at high temperatures, or both. In a further example, a seal coat layer of $SiO_2$, with or without BMAS particles, can be provided between the barrier layer and the intermediate layer 316 to provided adhesion and additional sealing. In further examples of any of the compositions disclosed herein, said compositions can include only the listed constituents. Additionally, in any of the examples disclosed herein, the matrix 106 and 318 can be continuous. The two-layer structure can also demonstrate good oxidation protection at 2000-2700° F. for 500 hours or longer as well as good adhesion with the ceramic-based top coat 114.

The barrier layer and/or intermediate layer 316 can be fabricated using a slurry coating method. The appropriate slurries can be prepared by mixing components, such as silicon oxycarbide, barium-magnesium alumino-silicate, and powder of silicon dioxide or colloidal silica (Ludox) in a carrier fluid, such as water. The slurries can be mixed by agitation or ball milling and the resulting slurry can be painted, dipped, sprayed or otherwise deposited onto the underlying substrate 104. The slurry can then be dried at room temperature or at an elevated temperature to remove the carrier fluid. In one example, the slurry is dried and cured at about 100-300° C. for about 5-60 minutes. During the heating, cross-linking of the colloidal silica occurs. The green coating can then be sintered at an elevated temperature in air for a selected amount of time. In one example, the sintering includes heating at 1500° C. or greater in an air environment for at least 1 hour.

The composite material 102 can be prepared using a slurry coating method. Slurries can be prepared by mixing components such as SiOC, BMAS, $SiO_2$ or Ludox (a source colloidal $SiO_2$) and water using agitation or ball milling. Various slurry coating methods such as painting, dipping and spraying can be used to coat ceramic matrix composite (CMC) substrates. Coatings formed from slurry are dried at room temperature and cured at 300° C. for about 5-60 minutes. During the heating, cross-linking of the colloidal silica occurs. This coating process can be repeated until all layers are coated. The bond coat is finally sintered at 1500° C. in air for at least 1 hour.

In one further example, a slurry of $SiOC/SiO_2$ 75/25 vol % was prepared by mixing appropriate amounts of SiOC and Ludox colloidal silica. A small amount of water was added to adjust the viscosity. The slurry was further mixed by ball milling for at least 15 hours. A slurry of $SiOC/BMAS/SiO_2$ 80/5/15 vol % was prepared likewise by mixing appropriate amounts of SiOC, BMAS and Ludox colloidal silica and ball milling for more than 15 hours.

An inner layer was applied on a cleaned CMC substrate 104 by painting. The coating was then dried at room temperature for about 5-60 minutes and heated in oven at between about 100-300° C. for about 5-60 minutes. During the heating, cross-linking of the colloidal silica occurs. An outer layer was applied in the same fashion as the inner layer with the exception that the outer layer was applied with two passes. In between the two passes, in one example, the specimen is submerged in Ludox colloidal silica solution, air dried at room temperature and heat treated at between about 100-300° C. for about 5-60 minutes to provide a silica sealing layer. After completion of the two layer bond coat, the specimen was sintered at 1500° C. for at least 1 hour.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article comprising:
   a ceramic-based substrate; and
   a barrier layer on the ceramic-based substrate, the barrier layer including:
      a matrix phase,
      a network of gettering particles in the matrix phase, wherein between 60 and 70 percent by volume of the gettering particles have a maximum dimension between about 30 and 70 microns, wherein the gettering particles have maximum dimensions that range from about 1 to 100 microns, and
      a dispersion of diffusive particles in the matrix phase.

2. The article as recited in claim 1, wherein the barrier layer includes, by volume, 30-94% of the gettering particles.

3. The article as recited in claim 2, wherein the barrier layer includes, by volume, 60-90% of the gettering particles.

4. The article as recited in claim 1, wherein the barrier layer includes, by volume, 1-30% of the diffusive particles, 5-40% of the matrix phase, and a balance of the gettering particles.

5. The article as recited in claim 1, wherein the diffusive particles have an average maximum dimension that is smaller than the average maximum dimension of the gettering particles.

6. The article as recited in claim 1, wherein the gettering particles have an average maximum dimension that is between about 40 and 60 microns.

7. The article as recited in claim 6, wherein the gettering particles have dimensions between about 5-75 microns.

8. The article as recited in claim 1, wherein the gettering particles are spherical.

9. The article as recited in claim 1, wherein the gettering particles are reactive with respect to oxidant species.

10. The article as recited in claim 1, wherein the gettering particles include at least one of silicon oxycarbide (SiOC) particles, silicon carbide (SiC) particles, silicon nitride ($Si_3N_4$), silicon oxycarbonitride (SiOCN) particles, silicon aluminum oxynitride (SiAlON) particles, and silicon boron oxycarbonitride (SiBOCN) particles.

11. The article as recited in claim 1, wherein the diffusive particles include at least one of barium magnesium aluminum silicate (BMAS), barium strontium aluminum silicate, magnesium silicate, alkaline earth aluminum silicate, yttrium aluminum silicate, ytterbium aluminum silicate, and rare earth metal aluminum silicate particles.

12. The article as recited in claim 1, further comprising a distinct intermediate layer between the barrier layer and the ceramic-based substrate, the distinct intermediate layer including an intermediate layer matrix of $SiO_2$ and a dispersion of intermediate layer gettering particles in the intermediate layer matrix.

13. The article as recited in claim 1, wherein the gettering particles are silicon oxycarbide particles that have a composition $SiO_xM_zC_y$, where M is at least one metal, x<2, y>0 and z<1 and x and z are non-zero, and wherein the diffusive particles are barium magnesium aluminum silicate particles.

14. The article as recited in claim 1, further comprising a ceramic-based top coat on the barrier layer.

15. A composite material comprising:
   a matrix of $SiO_2$;
   a dispersion of silicon oxycarbide particles in the matrix, the silicon oxycarbide particles having Si, O, and C in a covalently bonded network, wherein between 60 and 70 percent by volume of the silicon oxycarbide particles have a maximum dimension between about 30 and 70 microns, wherein the silicon oxycarbide particles have maximum dimensions that range from about 1 to 100 microns; and
   a dispersion of barium-magnesium alumino-silicate particles in the matrix.

16. The composite material as recited in claim 15, wherein the silicon oxycarbide particles have an average maximum dimension that is between about 40 and 60 microns.

17. The composite material as recited in claim 15, wherein the silicon oxycarbide particles are approximately spherical.

18. The composite material as recited in claim 15, wherein the silicon oxycarbide particles are reactive with respect to oxidant species.

19. A method of applying a barrier layer to a substrate, comprising:
   mixing particles of barium-magnesium alumino-silicate, particles of $SiO_2$, and particles of silicon oxycarbide in a carrier fluid to form a slurry, wherein between 60 and 70 percent of the silicon oxycarbide particles have a maximum dimension between about 30 and 70 microns, wherein the silicon oxycarbide particles have maximum dimensions that range from about 1 to 100 microns;
   applying the slurry to a substrate;
   drying the slurry; and
   curing the slurry such that cross-linking occurs in the composite material.

20. The method of claim 19, wherein the applying is by spraying.

21. The article as recited in claim 1, wherein a modal particle of the gettering particles has a maximum dimension of about 55 microns.

22. The article as recited in claim 21, wherein 10% of the volume of the gettering particles have a maximum dimension within about 5% of the maximum dimension of the modal particle.

23. The article as recited in claim 22, wherein 72% of the volume of the gettering particles have a maximum dimension within 50% of the maximum dimension of the modal particle.

* * * * *